US012163108B2

(12) United States Patent
Anderson et al.

(10) Patent No.: US 12,163,108 B2
(45) **Date of Patent: *Dec. 10, 2024**

(54) SOLID LAUNDRY SOFTENER COMPOSITION

(71) Applicant: ECOLAB USA INC., Saint Paul, MN (US)

(72) Inventors: Derrick Anderson, Saint Paul, MN (US); Emily Chen, Saint Paul, MN (US); Kaustav Ghosh, Saint Paul, MN (US); Kelsey West, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,771

(22) Filed: Feb. 7, 2023

(65) Prior Publication Data

US 2023/0174898 A1 Jun. 8, 2023

Related U.S. Application Data

(63) Continuation of application No. 16/946,556, filed on Jun. 26, 2020, now Pat. No. 11,597,893.

(Continued)

(51) Int. Cl.

*C11D 3/00* (2006.01)
*C11D 1/94* (2006.01)

(Continued)

(52) U.S. Cl.

CPC ................ *C11D 3/001* (2013.01); *C11D 1/94* (2013.01); *C11D 3/046* (2013.01); *C11D 3/30* (2013.01);

(Continued)

(58) Field of Classification Search

None

See application file for complete search history.

(56) References Cited

U.S. PATENT DOCUMENTS

| | | | | |
|---|---|---|---|---|
| 4,320,147 A | | 3/1982 | Schaeufele | |
| 4,328,110 A | * | 5/1982 | Green .................. | D06F 58/203 510/519 |

(Continued)

FOREIGN PATENT DOCUMENTS

| | | |
|---|---|---|
| EP | 0048163 A2 | 3/1982 |
| EP | 2121887 B1 | 3/2011 |

(Continued)

OTHER PUBLICATIONS

International Searching Authority in connection with PCT/US2020/039735 filed Jun. 26, 2020, "The International Search Report and the Written Opinion of the International Searching Authority, or the Declaration", 14 pages, mailed Oct. 9, 2020.

(Continued)

*Primary Examiner* — Liam J Heincer
*Assistant Examiner* — M. Reza Asdjodi
(74) *Attorney, Agent, or Firm* — McKee, Voorhees & Sease, PLC

(57) ABSTRACT

Solid laundry softening compositions and applications of use are disclosed. Solid laundry softening compositions combine quaternary ammonium compounds with an inorganic carrier to provide a flowable powder for solidification in a pressed or extruded solid composition. A high loading of quaternary ammonium compound in the inorganic carrier, including an inorganic salt, can be further combined with softening boosters, processing aids, surfactants, and/or additional functional ingredients to provide stable solid compositions.

18 Claims, 4 Drawing Sheets

Related U.S. Application Data

(60) Provisional application No. 62/868,089, filed on Jun. 28, 2019.

(51) Int. Cl.

| | |
|---|---|
| ***C11D 3/04*** | (2006.01) |
| ***C11D 3/30*** | (2006.01) |
| ***C11D 3/37*** | (2006.01) |
| ***C11D 11/00*** | (2006.01) |
| ***C11D 17/00*** | (2006.01) |
| *C11D 1/14* | (2006.01) |
| *C11D 1/75* | (2006.01) |
| *C11D 1/90* | (2006.01) |

(52) U.S. Cl.
CPC .......... *C11D 3/373* (2013.01); *C11D 17/0069* (2013.01); *C11D 17/0086* (2013.01); *C11D 1/143* (2013.01); *C11D 1/146* (2013.01); *C11D 1/75* (2013.01); *C11D 1/90* (2013.01); *C11D 2111/12* (2024.01)

(56) References Cited

U.S. PATENT DOCUMENTS

| | | | | |
|---|---|---|---|---|
| 5,389,685 | A | 2/1995 | Smith et al. | |
| 5,545,350 | A * | 8/1996 | Baker | C11D 1/645 510/525 |
| 5,545,749 | A | 8/1996 | Smith et al. | |
| 5,547,990 | A | 8/1996 | Hall et al. | |
| 5,562,849 | A | 10/1996 | Wahl et al. | |
| 5,833,741 | A | 11/1998 | Walker | |
| 6,258,767 | B1 | 7/2001 | Jacques et al. | |
| 6,464,764 | B1 | 10/2002 | Lichtenberg et al. | |
| 6,583,181 | B1 | 6/2003 | Chiang et al. | |
| 6,864,196 | B2 | 3/2005 | Graham et al. | |
| 6,939,840 | B2 | 9/2005 | Lichtenberg et al. | |
| 7,015,187 | B2 | 3/2006 | Demeyere et al. | |
| 8,221,733 | B2 | 7/2012 | Lichtenberg et al. | |
| 10,206,392 | B2 | 2/2019 | Kloeppel et al. | |
| 10,285,400 | B2 | 5/2019 | Lei et al. | |
| 10,426,162 | B2 | 10/2019 | Man et al. | |
| 11,044,907 | B2 | 6/2021 | Man et al. | |
| 11,597,893 | B2 * | 3/2023 | Anderson | C11D 17/0086 |
| 2003/0029812 | A1 | 2/2003 | Burns et al. | |
| 2003/0114342 | A1 | 6/2003 | Hall | |
| 2003/0187073 | A1 | 10/2003 | Lichtenberg et al. | |
| 2004/0220275 | A1 | 11/2004 | Lutzeler et al. | |
| 2005/0020476 | A1 | 1/2005 | Wahl et al. | |
| 2005/0124723 | A1 | 6/2005 | Fritschi et al. | |
| 2007/0275868 | A1 | 11/2007 | Cooremans et al. | |
| 2008/0274928 | A1 | 11/2008 | Smith et al. | |
| 2010/0292124 | A1 | 11/2010 | Smith et al. | |
| 2012/0137448 | A1 * | 6/2012 | Panandiker | C11D 1/62 510/516 |
| 2013/0274334 | A1 | 10/2013 | Li et al. | |
| 2014/0171512 | A1 | 6/2014 | Kloeppel et al. | |
| 2016/0298058 | A1 * | 10/2016 | Christensen | C11D 3/2079 |
| 2017/0284605 | A1 | 10/2017 | Janak et al. | |
| 2018/0037848 | A1 | 2/2018 | Schubert et al. | |
| 2018/0042228 | A1 | 2/2018 | Man et al. | |
| 2018/0249706 | A1 * | 9/2018 | Anderson | C11D 7/08 |
| 2019/0380335 | A1 | 12/2019 | Man et al. | |
| 2020/0229435 | A1 | 7/2020 | Malet et al. | |
| 2020/0305437 | A1 | 10/2020 | McGeechan et al. | |
| 2020/0407662 | A1 * | 12/2020 | Chen | C11D 3/3742 |
| 2020/0407663 | A1 * | 12/2020 | Anderson | C11D 3/046 |
| 2023/0174898 | A1 * | 6/2023 | Anderson | C11D 1/62 510/331 |

FOREIGN PATENT DOCUMENTS

| | | | | |
|---|---|---|---|---|
| JP | S63254199 | A | 10/1988 | |
| JP | H06341059 | A | 12/1994 | |
| WO | 0035283 | A1 | 6/2000 | |
| WO | 0059696 | A2 | 10/2000 | |
| WO | 2008049616 | A1 | 5/2008 | |
| WO | 2012176090 | A2 | 12/2012 | |
| WO | 2017009648 | A2 | 1/2017 | |
| WO | 2017009648 | A3 | 2/2017 | |
| WO | WO-2020264240 | A1 * | 12/2020 | C11D 1/62 |

OTHER PUBLICATIONS

Hein, Helmut, "Problems in the Production of Concentrated Domestic Fabric Softening Agents", Tenside Detergents, vol. 18, No. 5, pp. 243-246, Sep. 1, 1981.

* cited by examiner

SOLID LAUNDRY SOFTENER COMPOSITION

CROSS REFERENCE TO RELATED APPLICATIONS

This is a continuation application of U.S. Ser. No. 16/946,556, filed Jun. 26, 2020, which claims priority under 35 U.S.C. § 119 to provisional application Ser. No. 62/868,089, filed Jun. 28, 2019.

FIELD OF THE INVENTION

The invention relates to solid laundry softening compositions and applications of use. In particular, the solid laundry softening compositions combine quaternary ammonium compounds with an inorganic carrier to provide a flowable powder for solidification in a pressed or extruded solid composition. The compositions can also be used as a flowable powder that is used in a flowable powder unit dose or powder dosed directly into a laundry machine. A high loading of quaternary ammonium compound in the inorganic carrier, namely inorganic salt, can be further combined with softening boosters, processing aids, stabilizing surfactants, and/or additional functional ingredients to provide stable solid compositions.

BACKGROUND OF THE INVENTION

Softening traits are a highly desired combination of properties for textiles such as fibers and fabrics, both woven and non-woven. By the term "softness" it is meant the quality perceived by users through their tactile sense to be soft. Such tactile perceivable softness may be characterized by, but not limited to resilience, flexibility, fluffiness, slipperiness, and smoothness and subjective descriptions such as "feeling like silk or flannel." Various softening compositions are used in the consumer and residential sector along with industrial and institutional settings.

Fabric softener compositions are commonly used to deposit a fabric softening compound onto fabric. Typically, such compositions contain a cationic fabric softening agent dispersed in water. These fabric softening compositions are most often liquid compositions that are delivered into the rinsing bath. Rinse-added liquid softeners have certain benefits. For example, they are easy to handle, e.g., easy to dispense and to measure. The liquid softeners also minimizes the potential for concentrated deposition of the softener on an area of a fabric to cause visible staining. To facilitate the use of liquid softeners, some automatic clothes washers built with an automatic fabric softener dispenser require the fabric softener in liquid form for proper dispensing.

There is an ongoing need and consumer demand for solid fabric softener compositions instead of liquids. This is for multiple reasons. For example, liquid fabric softener products can contain about 90% to about 95% of water. These products require a great amount of packaging material, the transport of large weight (making shipping expensive), and large shelf space in the retail stores. Although liquid concentrated compositions are available, there remain a significant water content in the liquid compositions. Moreover, any liquid formulation will have shorter shelf-stability than a solid composition.

Accordingly, there is a need for improved solid fabric softener compositions to take advantage of their benefits—compactness of the compositions for transportation, reduced shipment costs, less packaging, more readily disposable containers that can be used, less chance for messy leakage, and less shelf space required in the retail stores. Solid formulations are also more stable to storage, and extremes of temperature. Despite these many advantages of a solid composition, it is still a challenge to develop a formulation of a solid softener that has a performance comparable to a liquid softener with the same kind and amount of active content. It is still more challenging to formulate concentrated solids to provide high dosing of the active fabric softening agent.

Quaternary ammonium compounds have long been known in the art for their fabric softening capabilities in liquid formulations. However, it is a challenge to formulate such actives in sufficiently high loading concentrations or wt-% over a solid softener composition. Moreover, it is a challenge to formulate such actives in high loading concentrations or wt-% of liquid or semi solid quaternary ammonium compounds into powdered solids. In particular, having high concentrations of quaternary ammonium compounds in pressed and extruded solids is a challenge as the processing of the solid compositions requires stable, flowable powders to provide the solid compositions. It is a known challenge to formulate quaternary ammonium compounds into flowable powder compositions for solidification.

Accordingly, it is an object herein to provide a solid laundry softener composition that performs at least as well as traditional liquid compositions in a stable solid form.

It is yet another object herein to provide a solid laundry softener that can have a high quaternary ammonium compound loading onto an inorganic carrier to provide a flowable powder to be solidified.

It is still further an object to obtain a flowable powder of the quaternary ammonium compound and inorganic carrier (and other components) to provide a stable, multi-use solid composition, such as a solid block. In still further objects, flowable powder can be used in a flowable powder unit dose or powder dosed directly into a laundry machine.

Other objects, advantages and features will become apparent from the following specification taken in conjunction with the accompanying drawings.

BRIEF SUMMARY OF THE INVENTION

An advantage of the solid laundry softening compositions, methods of processing and methods of use thereof, is that the pressed and/or extruded solid compositions provide a high level of quaternary ammonium compound loaded onto an inorganic carrier while maintaining a stable solid composition. A further advantage of the solid laundry softening compositions and methods of use thereof, is that the solid compositions can be further stabilized with a surfactant and/or one or more processing aids.

In an embodiment, a solid laundry softening composition comprises: at least about 15 wt-% of a quaternary ammonium compound having the formula:

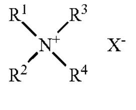

wherein $R^1$ and $R^2$ represent the same or different hydrocarbyl groups having from 8 to 24 carbon atoms, $R^3$ and $R^4$ represent the same or different hydrocarbyl groups containing 1 to about 4 carbon atoms, and X is an anion; and an inorganic salt carrier; wherein the solid composition is a pressed or extruded solid.

In a further embodiment, a method for treating fabric in a wash wheel comprises: providing a solid laundry softening composition according to any one of claims 1-16, wherein the solid laundry softening composition is a stable solid composition formed from a flowable powder; contacting the solid laundry softening composition with water to form an aqueous suspension; and dispensing the aqueous suspension to a wash wheel, where it contacts the fabric to be treated.

In a still further embodiment, a method of forming a stable, solid laundry softening composition comprises: combining an inorganic salt carrier and a quaternary ammonium compound having the formula:

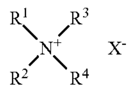

wherein $R^1$ and $R^2$ represent the same or different hydrocarbyl groups having from 8 to 24 carbon atoms, $R^3$ and $R^4$ represent the same or different hydrocarbyl groups containing 1 to about 4 carbon atoms, and X is an anion; forming a free-flowing powder; and forming a stable solid laundry softening composition by pressing the flowable powder or forming an extruded solid from the flowable powder, wherein the solid composition comprises at least 20 wt-% of the quaternary ammonium compound.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
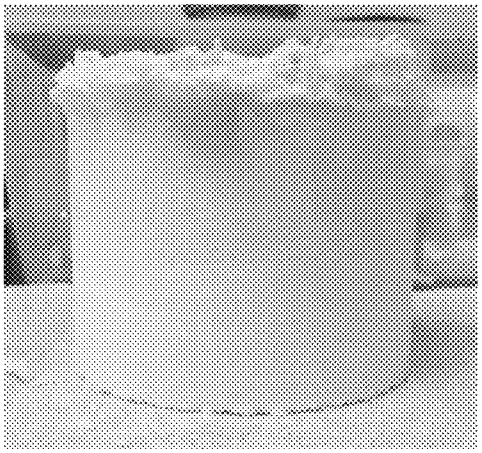
FIG. 1 shows the stability results of a pressed solid block composition containing a quaternary ammonium softener composition without a stabilizing agent after 3 days at a temperature of 40° C. and 65% relative humidity.

Various embodiments of the present invention will be described in detail with reference to the drawings, wherein like reference numerals represent like parts throughout the several views. Reference to various embodiments does not limit the scope of the invention. Figures represented herein are not limitations to the various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments are not limited to particular solid laundry softening compositions from flowable powders, methods of making, and/or methods of using, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning or fabric softening expressed as a percentage minus inert ingredients such as water or salts. As one skilled in the art will recognize, many laundering components are sold as emulsions and the percentage of active ingredients is included by the manufacture. As a matter of example only, if 100% of a final composition is comprised of emulsion X and if emulsion X contains 60% of the active component X, we would say that the final composition contained 60% active component X.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone.

Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiine, azolidine, pyrrolidine, pyrroline, oxolane, dihydrofuran, and furan.

The terms "dimensional stability" and "dimensionally stable" as used herein, refer to a solid product having a growth exponent of less than about 3%. If the solid product swells after solidification, various problems may occur, including but not limited to decreased density, integrity, and appearance; and inability to dispense or package the solid product. Generally, a solid product is considered to have dimensional stability if the solid product has a growth exponent of less than about 5%, or preferably less than about 3%. Growth exponent refers to the percent growth or swelling of a product over a period of time after solidification under normal transport/storage conditions. Because normal transport/storage conditions for products often results in the composition being subjected to an elevated temperature, the growth exponent of a solid product may be determined by measuring one or more dimensions of the product prior to and after heating at between about 100° F. and 122° F. The measured dimension or dimensions depends on the shape of the solid product and the manner in which it swells. For tablets, the change in both diameter and height is generally measured and added together to determine the growth exponent. For capsules, just the diameter is normally measured.

The term "hygroscopic" as used herein refers to the ability of a material to take up and retain moisture. As referred to herein "non-hygroscopic" or "not hydroscopic" refers to a material or composition containing a material that when exposed to moisture, such as humidity, does not absorb moisture in an amount that would cause the material or composition to become liquid. Hygroscopic materials cause the solid to absorb water, resulting in a softer solid with lower penetrometer value in this context.

The term "laundry", "linen," "fabric," and/or "textile" as used herein refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillowcases, towels, table linen, table cloth, bar mops and uniforms.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "sloughing" refers to large pieces or chunks of material falling out of or away from a solid composition during dispensing when water is used to bring a portion of a solid composition into an aqueous solution for dispensing. The pieces or chunks of solid material fall off the solid during or between dispensing in an unintentional and/or uncontrolled manner when the solid composition is softened by the dispensing water.

The term "solid" refers to a composition in a generally shape-stable form under expected storage conditions, for example a particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as less hard. In a preferred embodiment, the solid composition is a solid block that is made from loose, flowable powder.

The term "water soluble" refers to a compound that can be dissolved in water at a concentration of more than 1 wt. %.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight·percent," "wt-%," etc.

The compositions and methods described herein may comprise, consist essentially of, or consist of the components and ingredients as well as other ingredients described herein. As used herein, "consisting essentially of" means that the compositions and methods may include additional steps, components or ingredients, but only if the additional steps, components or ingredients do not materially alter the basic and novel characteristics of the claimed compositions and methods. It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Solid Laundry Softening Compositions

The solid laundry softening compositions according to the disclosure comprise, consist of, and/or consist essentially of a quaternary ammonium compound and an inorganic carrier. In embodiments, the solid compositions beneficially have high concentration or high loading of quaternary ammonium compound in the solid composition comprising the inorganic carrier. In an embodiment, the solid compositions have at least about 15 wt-%, at least about 20 wt-%, or at least about 25 wt-% quaternary ammonium compound. The solid compositions can also include a softening booster (e.g. silicone, polymers), stabilizing surfactant, and/or additional functional ingredients.

Exemplary ranges of the solid laundry softening compositions are shown in Tables 1A-1B in weight percentage of the solid compositions.

TABLE 1A

| Material | First Exemplary Range wt-% | Second Exemplary Range wt-% | Third Exemplary Range wt-% | Fourth Exemplary Range wt-% |
|---|---|---|---|---|
| Quaternary Ammonium Compound | 15-80 | 15-60 | 25-60 | 25-55 |
| Inorganic carrier | 40-80 | 50-80 | 50-70 | 55-70 |
| Additional Functional Ingredients | 0-50 | 0.1-40 | 1-30 | 1-20 |

TABLE 1B

| Material | First Exemplary Range wt-% | Second Exemplary Range wt-% | Third Exemplary Range wt-% | Fourth Exemplary Range wt-% |
|---|---|---|---|---|
| Quaternary Ammonium Compound | 15-80 | 15-60 | 25-60 | 25-55 |
| Inorganic carrier | 40-80 | 50-80 | 50-70 | 55-70 |
| Softening Booster (e.g. Silicone) | 0-20 | 0.5-20 | 1-10 | 1-5 |
| Stabilizing Surfactant | 0-30 | 1-30 | 5-25 | 5-20 |
| Additional Functional Ingredients | 0-50 | 0.1-40 | 1-30 | 1-20 |

Quaternary Ammonium Compounds

The solid laundry softening compositions described herein include at least one quaternary ammonium compound. A single quaternary ammonium compound or a combination of more than one quaternary ammonium compound may be included in embodiments of the solid compositions according to the invention. Quaternary ammonium compounds have the following general formula:

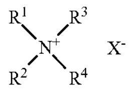

wherein $R^1$, $R^2$, $R^3$, and $R^4$ can each be C1-C24 aliphatic, normal or branched saturated or unsaturated hydrocarbon groups, alkoxy groups (R—O—), polyalkoxy groups, benzyl groups, allyl groups, hydroxyalkyl groups (HOR—), and the like, and X is an anion, preferably selected from halide, methyl sulphate or ethyl sulphate radicals. The quaternary ammonium compounds can include any anion or counter ion that allows the component to be used in a manner that imparts fabric-softening properties. Exemplary counter ions include chloride, methyl sulfate, ethyl sulfate, and sulfate.

Exemplary quaternary ammonium compounds for the solid laundry softening compositions have the following general formula:

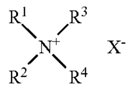

wherein $R^1$ and $R^2$ represent the same or different hydrocarbyl groups having from about 12 to about 24 carbon atoms, preferably from about 12 to about 22 carbon atoms, preferably from about 12 to about 18 carbon atoms, more preferably from about 14 to about 22 carbon atoms, or still more preferably from about 14 to about 20 carbon atoms; $R^3$ and $R^4$ represent the same or different hydrocarbyl groups containing about 1 to about 4 carbon atoms; and X is any suitable anion, such as a halide.

In an embodiment, it is beneficial that the quaternary ammonium compounds can be saturated, unsaturated, or hydrogenated, and having varying hydrocarbyl groups $R^1$ and $R^2$ and be loaded at a high level, such as at least 20 wt-%, at least 25 wt-% or greater, into a solid composition comprising the inorganic salts. Accordingly, various quaternary ammonium compounds for providing laundry softening can be combined with the inorganic salts at high loading concentrations. Additional description of quaternary ammonium compounds is set forth in U.S. Patent Publication Nos./Ser. Nos. 15/909,401 and 15/939,571, which are herein incorporated by reference in their entirety.

In some embodiments, quaternary ammonium compounds have highly saturated carbon backbones (i.e. high degree of saturation of alkyl groups) of the hydrocarbyl groups. Preferably the quaternary ammonium compounds has two long R alkyl or alkenyl based chains (i.e. $R^1$ and $R^2$) As referred to herein, "highly saturated" or a "high degree of saturation" with reference to the carbon backbones are represented by a low iodine value of the quaternary ammonium compounds, namely an iodine value equal to 15 or less. In other embodiments, quaternary ammonium compounds have unsaturated carbon backbones (i.e. low degree of saturation or unsaturated alkyl groups) of the hydrocarbyl groups.

Representative examples of quaternary ammonium compounds include, for example, alkyl benzyl ammonium chloride or alkyl dimethyl benzyl ammonium chloride (ADBAC), such as alkyl C12-C18 benzyl ammonium chloride, alkyl ethylbenzyl ammonium chloride or alkyl dimethyl ethylbenzyl ammonium chloride (ADEBAC), such as alkyl C12-C18 ethylbenzyl ammonium chloride, dialkyl ammonium salt or dialkyl dimethyl ammonium chloride, such as di alkyl C12-C18 di alkyl C1-C4 ammonium salt.

Representative examples of these quaternary ammonium compounds include, for example, di(tallow alkyl)dimethyl ammonium methyl sulphate; dihexadecyl dimethyl ammonium chloride; di(hydrogenated tallow alkyl)dimethyl ammonium chloride; dioctadecyl dimethyl ammonium chloride; di(hydrogenated tallow alkyl)dimethyl ammonium methyl sulphate; dihexadecyl diethyl ammonium chloride; di(coconut alkyl)dimethyl ammonium chloride; ditallow alkyl dimethyl ammonium chloride; and di(hydrogenated tallow alkyl)dimethyl ammonium chloride, and combinations thereof.

Further representative examples of quaternary ammonium compounds useful in the solid laundry softening composition include but are not limited to mono-C8-C24 alkyl trimethyl quaternary ammonium compounds, monomethyl tri-C8-24 alkyl quaternary ammonium compounds, imidazolinium quaternary ammonium compounds, dimethyl-C8-24 alkylbenzyl quaternary ammonium compounds, complex di quaternary ammonium compounds, di-C8-24 alkyl dimethyl quaternary ammonium compounds, mono or dialkyl di or trialkoxy quaternary ammonium compounds, mono or dialkyl di or tripolyalkoxy quaternary ammonium compounds, (the alkoxy group being a methoxy, ethoxy or propoxy group or a hydroxyethyl or hydroxypropyl; the polyalkoxy being polyethoxy or polypropoxy group with 2-50 alkoxy groups), diamidoamine-methyl-C8-C22 alkyl-quaternary ammonium compounds, and di-C8-C22 alkyl methyl benzyl quaternary ammonium compounds.

The solid laundry softening compositions can include a quaternary ammonium compound having sufficient saturated hydrocarbon groups, such as the alkyl groups, to have an iodine value equal to 15 or less. In a further embodiment, the solid laundry softening compositions can include a dialkyl quaternary ammonium compound having saturated alkyl groups for $R^1$ and $R^2$ having from about 8 to about 24 carbon atoms, from about 12 to about 24 carbon atoms, preferably from about 12 to about 22 carbon atoms, more preferably from about 14 to about 22 carbon atoms, or still more preferably from about 14 to about 20 carbon atoms. In a preferred aspect, the dialkyl quaternary ammonium compound is a di(hydrogenated tallowalkyl)dimethyl ammonium chloride (DHTDMAC), DEEDMA(C) quat, or an ester quat.

The solid laundry softening compositions can include an amidoamine quaternary ammonium compound, including for example diamidoamine quaternary ammonium compounds. Exemplary diamidoamine quaternary ammonium compounds are available under the name Varisoft®. Exemplary amidoamine quaternary ammonium compounds include methyl-bis(tallow amidoethyl)-2-hydroxyethyl ammonium methyl sulfate, methyl bis(oleylamidoethyl)-2-hydroxyethyl ammonium methyl sulfate, and methyl bis (hydr.tallowamidoethyl)-2-hydroxyethyl ammonium methyl sulfate.

The solid laundry softening compositions can include an imidazolinium quaternary compound. Exemplary imidazolinium quaternary ammonium compounds include methyl-1hydr. tallow amido ethyl-2-hydr. tallow imidazolinium-methyl sulfate, methyl-1-tallow amido ethyl-2-tallow imidazolinium-methyl sulfate, methyl-1-oleyl amido ethyl-2-oleyl imidazolinium-methyl sulfate, and 1-ethylene bis(2-tallow, 1-methyl, imidazolinium-methyl sulfate).

The solid laundry softening compositions can include an alkylated quaternary compound. Exemplary alkylated quaternary ammonium compounds include ammonium compounds having an alkyl group containing between 6 and 24 carbon atoms. Exemplary alkylated quaternary ammonium compounds include monoalkyl trimethyl quaternary ammonium compounds, monomethyl trialkyl quaternary ammonium compounds, and dialkyl dimethyl quaternary ammonium compounds. The alkyl group is preferably C12-C24, C12-C18, C14-C24, C14-C22, C14-C20, or C14-C18 group that is aliphatic and saturated or unsaturated, straight or branched.

The solid laundry softening compositions can include an ester quaternary compound. Ester quats refer to a compound having at least two or more alkyl or alkenyl groups connected to the molecule via at least one ester link. An ester quaternary ammonium compound can have at least one, or can have two or more ester links present. Exemplary ester quaternary ammonium compounds include for example, di-alkenyl esters of triethanol ammonium methyl sulphate and N,N-di(tallowoyloxy ethyl)N,N-dimethyl ammonium chloride, polyol ester quat (PEQ). Commercial examples of compounds include, but are not limited to, di-oleic ester of triethanol ammonium methyl sulphate, di-oleic ester of triethanol ammonium methyl sulphate, partially hardened tallow ester of triethanol ammonium ethyl sulphate, palm ester of triethanol ammonium methyl sulphate, hardened tallow ester of triethanol ammonium methyl sulphate, unsaturated carboxylic acid reaction products with triethanolamine dimethyl sulphate quaternized. Further examples include triethanolamine (TEA) ester quats (e.g., methyl bis(ethyl tallowate)-2-hydroxyethyl ammonium methyl sulfate), methyldiethanolamine (MDEA) ester quats, diamidoquats (e.g., methyl bis(hydrogenated tallow amidoethyl)-2-hydroxyethyl ammonium methyl sulfate), and dialkyldimethyl quats (e.g., dihydrogenated tallow dimethyl ammonium chloride). Preferred ester quats are those made from the reaction of alkyl carboxylic acid fraction, methyl ester and triglyceride with triethanolamine. Additional description of the ammonium quaternary fabric softening actives is disclosed in U.S. Pat. No. 4,769,159, which is herein incorporated by reference. In some non-limiting embodiments, the ammonium quaternary laundry softening active employed has a low iodine value. Iodine values are a measurement of unsaturation of the alkyl chain or alkyl backbone of a quaternary ammonium compound. In an embodiment an iodine value of 15 or less, less than about 15, less than about 14, less than about 13, less than about 12, less than about 11, less than about 10, less than about 9, less than about 8, less than about 7, less than about 6, less than about 5, less than about 4, less than about 3, less than about 2, less than about 1, or even 0, and provides the beneficial solid quat formulations in combination with the silicone actives described herein. Iodine values can be calculated according to ASTM D5554-15, Standard Test Method for Determination of the Iodine Value of Fats and Oils wherein the same method is used for determining the iodine value of an alkyl chain or alkyl backbone of a quaternary ammonium compound. In other embodiments, the ammonium quaternary laundry softening active is not limited to having an iodine value less than 15, and instead unsaturated compounds may be preferred. In further embodiments, the quaternary ammonium compound may be biodegradable compound.

In an embodiment one or more of the quaternary ammonium compounds are included in the solid composition in an amount of from about 5 wt-% to about 80 wt-%, 10 wt-% to about 80 wt-%, 15 wt-% to about 80 wt-%, 20 wt-% to about 80 wt-%, from about 25 wt-% to about 80 wt-%, from about 20 wt-% to about 60 wt-%, from about 25 wt-% to about 60 wt-%, preferably from about 25 wt-% to about 55 wt-% by weight based on the total weight of the solid laundry softening composition. In embodiments, the inclusion of a softening booster can reduce the concentration of quaternary ammonium compounds in the solid composition, such as at concentrations as low as about 5 wt-%.

Inorganic Carrier

An inorganic carrier is included in the solid laundry softening compositions, namely as a solidification agent for the quaternary ammonium compound. Inorganic carriers include inorganic salts can include various cations (positive charged ions) with anions (negative ions) to provide a neutral salt for combination with the quaternary ammonium compound. Without being limited to particular mechanism of action or theory of the invention, the inorganic salts are beneficially used in the solid laundry softening compositions to absorb high levels of liquids from quaternary ammonium compounds to allow greater loading rates into the solid compositions that are conventionally available, while also beneficially able to undergo solidification processing due to lower processing temperatures compared to the molten liquids conventionally produced for cast solid compositions.

Salts preferably include water soluble salts.

Suitable cations for the inorganic salt include, for example, magnesium, sodium, potassium, calcium, ammonium, and an amine. Suitable anions for the inorganic salt include, for example, chloride, sulfate, carboxylate, polycarboxylate, carbonate, bicarbonate, carboxylate, phosphate, and hydroxide. Exemplary inorganic salts include, for example magnesium sulfate, sodium sulfate, sodium chloride, citrate salts, ethylene diamine tetraacetic acid salts (EDTA), sodium carbonate, sodium bicarbonate, sodium carboxylate, sodium hydroxide, potassium chloride, potassium hydroxide, calcium chloride, ammonium carboxylate salts, and the like.

In an embodiment one or more inorganic salts are included in the solid composition in an amount of from about 40 wt-% to about 80 wt-%, preferably from about 50 wt-% to about 80 wt-%, preferably from about 50 wt-% to about 70 wt-%, or from about 55 wt-% to about 70 wt-% by weight based on the total weight of the solid laundry softening composition.

Additional Functional Ingredients

The components of the solid laundry softening compositions can further be combined with various functional components suitable for use in laundry softening applications and/or processing and forming the solid laundry softening compositions. In some embodiments, the solid composition including the quaternary ammonium compound and inorganic carrier make up a large amount, or even substantially all of the total weight of the solid composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution or suspension, provides a beneficial property in fabric softening and/or maintaining stability and suitable processing and/or dispensing of the solid composition. Some particular examples of functional materials are discussed in more detail below, although the particular materials discussed are given by way of example only, and that a broad variety of other functional ingredients may be used.

In preferred embodiments, the compositions include a softening booster. In other embodiments, the compositions may include salts, defoaming agents, anti-redeposition agents, solubility modifiers, dispersants, stabilizing agents, sequestrants and/or chelating agents, surfactants, anti-wrinkling agents, optical brighteners, fragrances and/or dyes, rheology modifiers or thickeners, hydrotropes or couplers, buffers, solvents, enzymes, soil-release agents, dye scavengers, starch/crisping agent, germicides/fungicides, antioxidants or other skin care components, sanitizers and components for residual protection, and the like.

Softening Booster

The solid laundry softening compositions can optionally include a softening booster. Softening boosters include silicone compounds and polymers, deposition aids, such as cationic celluloses and cationically charged polymers, such as polyquaterniums, guar derivatives, and other boosters that do not function alone as softeners, instead boost the softness of the quaternary ammonium compound.

In an embodiment, at least one silicone compound or polymer for added softening benefit in combination with the quaternary ammonium compound is included. The silicone compound or polymer boosts the softness of the quaternary ammonium compound in addition to providing active softness. Suitable silicones include those having hydrophilic functionality, such as an organosilicone, such as: a polyalkyl silicone, an aminosilicone, a siloxane, a polydimethyl siloxane, an ethoxylated organosilicone, a propoxylated organosilicone, an ethoxylated/propoxylated organosilicone, and mixtures thereof.

In one embodiment, the organosilicone is an aminofunctional silicone or silicone quaternary ammonium compound, hydroxyl modified silicone, or silicone with an incorporated hydrophilic group, and emulsions thereof. Examples of incorporated hydrophilic groups include for example, EO/PO, or PEG modified silicones).

Organosilicones not only provide softness and smoothness to fabrics, but also provide a substantial color appearance benefit to fabrics, especially after multiple laundry washing cycles. Exemplary organosilicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. In one aspect, the organosilicones may comprise a viscosity of from about 10 to about 2,000,000 centistokes at 25° C. In another aspect, suitable organosilicones may have a viscosity of from about 10 to about 800,000 centistokes at 25° C. Suitable organosilicones may be linear, branched or cross-linked. Suitable organosilicones may be in the form of neat liquids, combinations with solvents, or emulsions in water. If aqueous emulsions are used, the preferred silicones are as concentrated as possible to minimize the amount of liquid added to the composition, since large amounts of liquid can complicate the solidification process.

A linear or branched structured silicone polymer can also be used in the solid laundry softening compositions. The silicone of the present invention can further be a single polymer or a mixture of polymers. In a preferred aspect the silicone is an amino-functional silicone which can be a linear or branched structured amino-functional silicone polymer and can further be a single polymer or a mixture of polymers, including a mixture of polymers wherein one of the polymers contains no amino functionality, e.g., a polydimethylsiloxane polymer.

Polymers can also be included in the softener booster. Exemplary polymers can include polyalkylenes such as polyethylene, polypropylene, and random and/or block copolymers of polyethylene and polypropylene; polyethylene oxides; EO-PO polymers; polyesters such as polyethylene glycol and biodegradable polymers such as polylactide and polyglycolic acid; polyurethanes; polyamides; polycarbonates; polysulfonates; polysiloxanes; polydienes such as polybutylene; polyacrylates such as polymethylmethacrylate; and additional polymers such as polystyrene and polyacrylonitrile-butadiene-styrene; mixtures of polymers; and copolymerized mixtures of polymers.

In a preferred aspect, the silicone does not include ester based polysiloxanes. In particular, the ester based polysiloxanes include those polymers with a cleavable bond as described in U.S. Publication No. 2019/0024018, the disclosure of which is incorporated by reference. These polysiloxanes excluded from the silicone compound of the solid compositions include siloxane polymers having at least one unit of the following formula (I):

Formula 1

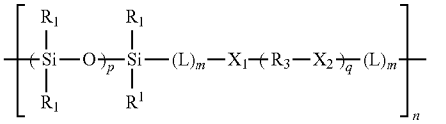

wherein:

(a) L is a linking bivalent alkylene radical, each $R_2$ is independently selected from the group consisting of H, $C_1$-$C_4$ alkyl, substituted alkyl, aryl, substituted aryl, and combinations thereof, each s is independently an integer of from 2 to about 12; each y is independently an integer of from 1 to about 100, (b) each $X_1$ and $X_2$ is independently selected from the group consisting of:

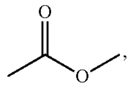,
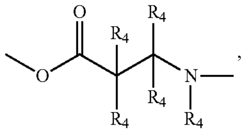,
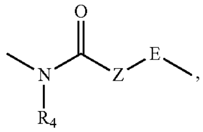,
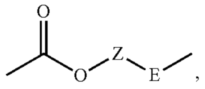,
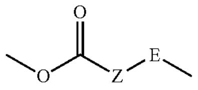

E=electron withdrawing group, each of $R_4$ moiety is independently selected from the group consisting of H, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl; and each Z is independently selected from the group consisting of:

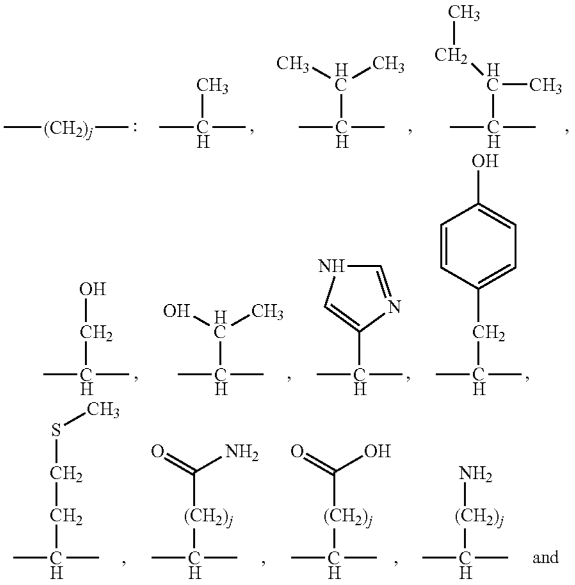

and

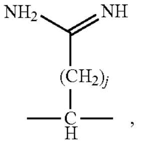, the index j is an integer from 1-32, (c) each $R_1$ is independently selected from the group consisting of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy, (d) each $R_3$ is independently selected from the group consisting of $C_1$-$C_{32}$ alkylene, $C_1$-$C_{32}$ substituted alkylene, $C_6$-$C_{32}$ aryl, $C_5$-$C_{32}$ substituted aryl, $C_6$-$C_{32}$ alkylenearyl, and $C_5$-$C_{32}$ substituted alkylenearyl, (e) each index m is one or zero, (f) each q is 1 or zero, (g) each index p is an integer of from about 2 to about 1000, and (h) the index n is an integer of from about 1 to about 50.

Cationic cellulose and cationically charged polymers, such as polyquaterniums can be used as a softening booster. The term polyquaternium is the International Nomenclature for Cosmetic Ingredients (INCI) designation for various polycationic polymers, including polyquaternium 1-47. For example, polyquaternium-4 is a hydroxyethyl cellulose dimethyl diallylammonium chloride copolymer, polyquaternium-10 is a quaternized hydroxyethyl cellulose, and polyquaternium-24 is a hydroxyethyl cellulose or hydroxypropylcellulose quaternized with glycidyl C12-C22 alkyl dimethyl ammonium chloride. Exemplary polyquaterniums for softening boostening include, for example, Polyquaternium-1, Polyquaternium-5, Polyquaternium-6, Polyquaternium-7, Polyquaternium-8, Polyquaternium-10, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients. Various polyquaterniums are commercially available including Flosof LS407 and 447 from SNF Floerger, SOFTCAT SK from Dow Chemicals, CELQUAT H200 and CELQUAT L-200 from National Starch and Chemical Company.

An exemplary grouping of softening boosters include the cationic cellulosic polymers cocodimethylammonium hydroxypropyl oxyethyl cellulose, lauryldimethylammonium hydroxypropyl oxyethyl cellulose, stearyldimethylammonium hydroxypropyl oxyethyl cellulose, and stearyldimethylammonium hydroxyethyl cellulose; cellulose 2-hydroxyethyl 2-hydroxy 3-(trimethyl ammonio) propyl ether salt, Polyquaternium-4, Polyquaternium-10, Polyquaternium-24 and Polyquaternium-67 or mixtures thereof.

Additional examples of boosters can include starches that have been chemically modified to provide the starch with a net positive charge in aqueous solution at pH 3. This chemical modification includes, but is not limited to, the addition of amino and/or ammonium group(s) into the starch molecules. Non-limiting examples of these ammonium groups may include substituents such as trimethylhydroxypropyl ammonium chloride, dimethylstearylhydroxypropyl ammonium chloride, or dimethyldodecylhydroxypropyl ammonium chloride. The source of starch before chemical modification can be chosen from a variety of sources including tubers, legumes, cereal, and grains. Non-limiting examples of this source of starch may include corn starch, wheat starch, rice starch, waxy corn starch, oat starch, cassaya starch, waxy barley, waxy rice starch, glutenous rice starch, sweet rice starch, amioca, potato starch, tapioca starch, oat starch, sago starch, sweet rice, or mixtures thereof. Nonlimiting examples of cationic starches include cationic maize starch, cationic tapioca, cationic potato starch, or mixtures thereof. The cationic starches may comprise amylase, amylopectin, or maltodextrin. The cationic starch may comprise one or more additional modifications. For example, these modifications may include cross-linking, stabilization reactions, phosphorylations, hydrolyzations, cross-linking. Stabilization reactions may include alkylation and esterification.

Guar derivatives, including nonionic guars and cationic guars, in addition to a mixture of nonionic and cationic guars, such as Easysoft from Solvay (mixture of hydrophobically modified nonionic guar and cationic guar) can be used as softening boosters. Cationic guar gums are a quaternary ammonium derivative of hydroxypropyl guar such as those sold under the trade name JAGUAR from Rhodia, Inc. Additional examples of cationic polymers include polysaccharide polymers, cationic guar gum derivatives, quaternary nitrogen-containing cellulose ethers, synthetic polymers, copolymers of etherified cellulose, guar and starch.

Exemplary cationic polymers include those produced by polymerization of ethylenically unsaturated monomers using a suitable initiator or catalyst, and also include synthetic polymers made by polymerizing one or more cationic monomers, including N,N-dialkylaminoalkyl acrylate, N,N-dialkylaminoalkyl methacrylate, N,N-dialkylaminoalkyl acrylamide, N,N-dialkylaminoalkylmethacrylamide, quaternized N, N dialkylaminoalkyl acrylate quaternized N,N-dialkylaminoalkyl methacrylate, quaternized N,N-dialkylaminoalkyl acrylamide, quaternized N,N-dialkyl aminoalkylmethacrylamide, methacrylo amidopropyl-pentamethyl-1,3-propylene-2-ol-ammonium dichloride, N,N,N,N',N',N",N"-heptamethyl-N"-3-(1-oxo-2-methyl-2-propenyl)aminopro-pyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally an additional monomer including acrylamide, N,N-dialkyl acrylamide, methacrylamide, N,N-dialkylmethacrylamide, C1-C12 alkyl acrylate, C1-C12 hydroxyalkyl acrylate, polyalkylene glycol acrylate, C1-C12 alkyl methacrylate, C1-C12 hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. In other embodiments, the cationic polymer backbone does not contain a cationic monomer and instead provides a cationic functionality.

In embodiments employing a softening booster, the softening booster is present at a level in the range of from about 0.1 wt-% to about 20 wt-%, from about 0.5 wt-% to about 20 wt-%, from about 1 wt-% to about 20 wt-%, from about 0.1 wt-% to about 10 wt-%, from about 0.1 wt-% to about 5 wt-%, from about 1 wt-% to about 10 wt-%, or from about 1 wt-% to about 5 wt-% based on the total weight of the solid laundry softening composition. In some embodiments, non-silicone boosters are present a level in the range of from about 0.01 wt-% to about 10 wt-%, from about 0.1 wt-% to about 10 wt-%, from about 0.1 wt-% to about 5 wt-%, or from about from about 0.1 wt-% to about 2 wt-%.

Without being limited to a particular mechanism of action the ratio of the quaternary ammonium compound to the silicone or other softening booster in the solid laundry softening composition provides efficacious softening without deleterious effects on treated surfaces when provided in a ratio less than about 3:1, preferably from about 2.4:1 to about 1.8:1, or most preferably from about 2:1.

Stabilizing Surfactant

In preferred embodiments, the surfactants include anionic surfactants and/or amphiphilic (e.g. amine oxide) surfactants to formulate a stable solid with the quaternary ammonium compounds and the inorganic carrier. The surfactant concentration in the solid compositions can range from about 1 wt-% to about 30 wt-%, from about 5 wt-% to about 30 wt-%, from about 5 wt-% to about 25 wt-%, from about 5 wt-% to about 20 wt-%, or from about 5 wt-% to about 15 wt-%.

Anionic Surfactants

Anionic surfactants have a negative charge on the hydrophobe; or the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and calcium, barium, and magnesium promote oil solubility.

Anionic sulfate surfactants suitable for use as a stabilizing surfactant for the hygroscopic material include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly (ethyleneoxy) ether sulfates and aromatic poly(ethyleneoxy) sulfates such as the sulfates or condensation products of ethylene oxide and nonyl phenol (usually having 1 to 6 oxyethylene groups per molecule). Suitable anionics also include alkyl sulfonates, the linear and branched primary and secondary alkyl sulfonates, and the aromatic sulfonates with or without substituents. An exemplary alkyl sulfonate anionic surfactant is alpha olefin sulfonate.

Additional suitable anionics include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g. up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$R—O—(CH_2CH_2O)_n$ $(CH_2)_m—CO_2X$ (3) in which R is a $C_8$ to $C_{22}$ alkyl group or

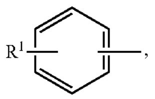, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

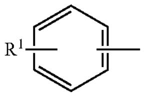

and $R^1$ is a $C_6$-$C_{12}$ alkyl group. In still yet other embodiments, $R^1$ is a $C_9$ alkyl group, n is 10 and m is 1.

Amphiphilic Surfactants

Also useful in the compositions are surface active substances which are categorized as amphiphilic surfactants. Amphiphilic (or amphoteric) surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphino. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Amine oxides are tertiary amine oxides corresponding to the general formula:

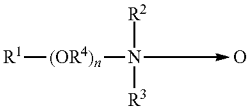

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 18 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Suitable amine oxides can include those selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide. An exemplary commercially available cocoamine oxide surfactant is BARLOX 12, available from Lonza.

Suitable long chain imidazole derivatives may generally have the general formula:

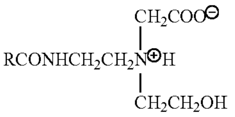

(MONO)ACETATE

-continued

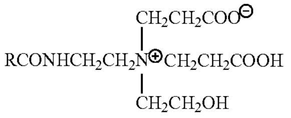

(DI)PROPIONATE

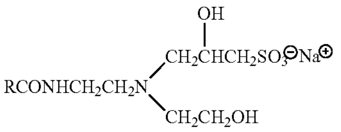

AMPHOTERIC SULFONATE

Neutral pH - Zwitterion wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes which are suitable include, without limitation, alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J. A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Cationic Surfactants

Also useful in the compositions are surface active substances which are categorized as cationic surfactants if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The simplest cationic amines, amine salts and quaternary ammonium compounds can be schematically drawn thus:

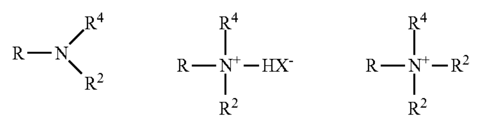

in which, R represents an alkyl chain, R', R", and R'" may be either alkyl chains or aryl groups or hydrogen and X represents an anion.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like, Cationic surfactants useful in the compositions include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

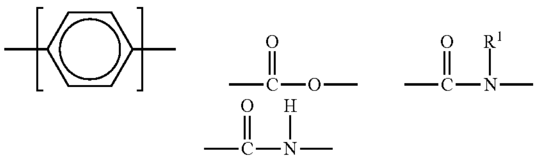

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y can be a group including, but not limited to:

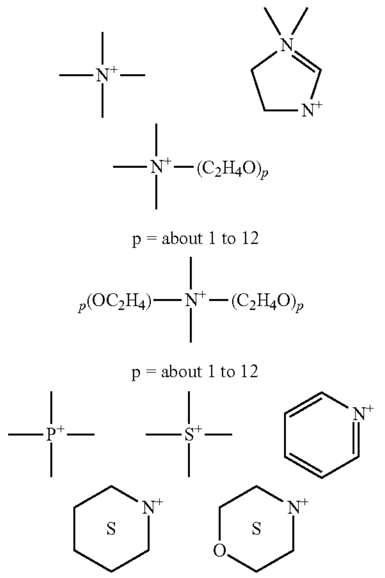

p = about 1 to 12 p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Additional Functional Ingredients

Other active ingredients may optionally be used to improve the effectiveness of the compositions and/or solidification of the compositions. Non-limiting examples of such additional functional ingredients can include additional surfactants (including for softness), anticorrosion agents, enzymes, foam inhibitors, thickeners, antiredeposition agents, anti-etch agents, antimicrobial agents, bleaching agents, catalysts, solidification aids, salt for conductivity, dispersants, fragrances, processing aids, and other ingredients useful in imparting a desired characteristic or functionality in the composition. The following describes some examples of such ingredients.

Processing Aid

Processing aids can provide advantageous features to the solid compositions. In an embodiment, the processing aid for solidification includes one or more non-deliquescent materials. Beneficially, including a non-deliquescent material provides a non-hygroscopic material such that when the solid composition is exposed to humidity (such as during the dispensing of a solid composition) the composition does not absorb water or does not absorb sufficient water to become liquid. This is important due to the dispensing challenges, namely humid environments that the solid compositions are exposed to.

The solid laundry softening compositions may include one or more processing aids that are medium to long chain fatty carboxylic acids. Exemplary fatty acids, such as a free fatty acids can be employed and the term "fatty acid" is used herein in the broadest sense to include unprotonated or protonated forms of a fatty acid. One skilled in the art will readily appreciate that the pH of an aqueous composition will largely determine whether a fatty acid is protonated or unprotonated. The fatty acid may be in its unprotonated, or salt form, together with a counter ion, such as, but not limited to, calcium, magnesium, sodium, potassium, and the like. The term "free fatty acid" means a fatty acid that is not bound to another chemical moiety (covalently or otherwise). The fatty acid may include those containing from 12 to 25, from 13 to 22, or even from 16 to 20, total carbon atoms, with the fatty moiety containing from 10 to 22, from 12 to 18, or even from 14 (mid-cut) to 18 carbon atoms. The fatty acids may be derived from (1) an animal fat, and/or a partially hydrogenated animal fat, such as beef tallow, lard, etc.; (2) a vegetable oil, and/or a partially hydrogenated vegetable oil such as canola oil, safflower oil, peanut oil, sunflower oil, sesame seed oil, rapeseed oil, cottonseed oil, corn oil, soybean oil, tall oil, rice bran oil, palm oil, palm kernel oil, coconut oil, other tropical palm oils, linseed oil, tung oil, castor oil, etc.; (3) processed and/or bodied oils, such as linseed oil or tung oil via thermal, pressure, alkali-isomerization and catalytic treatments; (4) combinations thereof, to yield saturated (e.g. stearic acid), unsaturated (e.g. oleic acid), polyunsaturated (linoleic acid), branched (e.g. isostearic acid) or cyclic (e.g. saturated or unsaturated disubstituted cyclopentyl or cyclohexyl derivatives of polyunsaturated acids) fatty acids. Mixtures of fatty acids from different fat sources can be used.

Suitable carboxylic acids may be saturated or unsaturated, but are preferably saturated carboxylic acids. These carboxylic acids have at least 6 carbon atoms, or from about 6 to about 22 carbon atoms on the alkyl or alkenyl chain, and are in either straight chain or branched chain configuration, preferable carboxylic acids are in straight chain configuration having at least 6 carbon atoms, preferably from about 12 to about 22 carbon atoms. Non-limiting examples of useful carboxylic acids include lauric acid (C12), stearic acid (C18), palmitic acid (C16) or behenic acid (C22). Additional examples include long chain fatty acids or its salt, such as stearic acid, palmitic acid, coco fatty acid, stearic monoethanolamide, coco-monoethanolamide, and the like. Without being limited to a particular mechanism of action or theory of the invention, the C6-C22 alkyl chains of the carboxylic acid stabilizing agents are preferred as they readily form hard, low-melting urea occlusion complexes and are compatible with quaternary ammonium compounds.

Additional processing aids can include LMEA (lauric monoethanolamide), SMEA (stearic monoethanolamide), etc. Various hydrophobic species that are solid at room temperature are suitable for use as stabilizing agents, including but not limited to: palmitic acid, coco fatty acid, lauric monoethanolamide, stearic monoethanolamide, coco-monoethanolamide, fatty acids described above. Additional stabilizing agents can include alkyl quaternary ammonium compounds.

According to the various embodiments described herein, preferred processing aids have a solubility between 4 ppm and 10,000 ppm in water at 45° C. and are compatible with quaternary ammonium compounds. Further preferred processing aids have a melting point above 60° C., preferrably between 60° C. and 100° C., and are compatible with quaternary ammonium compounds.

When included in the solid laundry softening composition the processing aid is present at a level of from about 0.1% to about 5.0% by weight based on the total weight of the composition, preferably from about 0.5% to about 4.5%, and most preferably from about 1% to about 4% by weight based on the total weight of the solid laundry softening composition.

Salt for Conductivity

The solid composition may also include at least one additional salt as an additional processing aid. In an embodiment, the additional salt is a salt for conductivity and/or is an inorganic anion or non-sequestering organic anion to allow for standard measurements of conductivity of the wash solution. Sodium chloride is preferably used, however a wide variety of ionizable salts can be used. Examples of suitable salts are the halides and acetates of the group IA metals of the Periodic Table of the Elements, for example, lithium chloride, sodium chloride, potassium chloride, ammonium chloride, sodium bromide, potassium bromide, calcium bromide, sodium iodide, potassium iodide, sodium acetate, potassium acetate, or mixtures thereof. Sodium chloride is preferred. The ionizable salts are particularly useful during the process of mixing the ingredients to make the compositions herein, and later to obtain the desired conductivity for measurement of dispersement rates of the softening composition. The amount of ionizable salts used depends on the amount of active ingredients used in the compositions and can be adjusted according to the desire of the formulator.

Dispersant

A dispersant may be included to help remove soils and microorganisms from articles and surfaces. Examples of dispersants include, but are not limited to, to water soluble polymers, surfactants, hydrotropes, and wetting agents. In a preferred embodiment the dispersant is an anionic surfactant. The composition need not include a dispersant, but when a dispersant is included it can be included in an amount that provides the desired dispersant properties. Suitable ranges of the dispersant in the composition can be up to about 20 wt-%, about 0.5 to about 15 wt-%, or about 2 to about 9 wt-%.

Fragrance

The solid composition may also include any softener compatible fragrance/perfume. Suitable perfumes are disclosed in U.S. Pat. No. 5,500,138, said patent being incorporated herein by reference.

Additional Surfactants

The solid compositions may also include additional surfactants for performance benefits even if they are unable to provide solid formulation or stability benefits such as the anionic surfactants and/or amphiphilic (e.g. amine oxide) surfactants demonstrate herein. In an embodiment, nonionic surfactants can be included in addition to the anionic and/or amphiphilic surfactants.

Methods of Making the Solid Compositions

The solid laundry softening compositions shown in Tables 1A-1B can be solidified. The solid compositions can be manufactured in commonly available mixing equipment. In embodiments, the liquid materials can be adapted to a solid by incorporating into the composition a solidification agent, namely the inorganic salts.

In some embodiments, in the formation of a solid composition, a mixing system may be used to provide for continuous mixing of the ingredients at high enough shear to form a substantially homogeneous solid or semi-solid mixture in which the ingredients are distributed throughout its mass. The mixture is processed at a temperature to maintain the physical and chemical stability of the ingredients. An ingredient may be in the form of a liquid or a solid such as a dry particulate, and may be added to the mixture separately or as part of a premix with another ingredient. One or more premixes may be added to the mixture. The ingredients are mixed to form a substantially homogeneous consistency wherein the ingredients are distributed substantially evenly throughout the mass. The mixture can be discharged from the mixing system through a die or other shaping means. The profiled extrudate then can be divided into useful sizes with a controlled mass.

The composition hardens due to the chemical or physical reaction of the requisite ingredients forming the solid. The solidification process may last from a few minutes to about six hours, or more, depending, for example, on the size of the pressed or extruded composition, the ingredients of the composition, the temperature of the composition, and other like factors. In some embodiments, the solid composition "sets up" or begins to hardens to a solid form within about 1 minute to about 3 hours, or in the range of about 1 minute to about 2 hours, or in some embodiments, within about 1 minute to about 20 minutes.

In some embodiments, the pressed or extruded solid can be packaged, for example in a container or in film. The temperature of the mixture when discharged from the mixing system can be sufficiently low to enable the mixture to be pressed or extruded directly into a packaging system without first cooling the mixture. The time between discharge and packaging may be adjusted to allow the hardening of the composition for better handling during further processing and packaging. In some embodiments, the mixture at the point of discharge is in the range of about 20° C. to about 60° C., or in some embodiments, in the range of about 25° C. to about 55° C., or preferably at room temperature. The composition is then allowed to harden to a solid form that may range from a low density, sponge-like, malleable, caulky consistency to a high density, fused solid, concrete-like solid.

Solid Compositions

The solid laundry softening compositions are preferably multi-use solid compositions formed by combining the components in the weight percentages and ratios disclosed herein. The solid compositions are provided as a solid and a use solution, wherein the use solution is a suspension, is formed during the dispensing and/or laundering process.

The solid compositions are substantially homogeneous with regard to the distribution of ingredients throughout its mass and are dimensionally stable. The compositions can either be pressed into solids or used as a flowable powder as a unit dose or powder dosed directly into a machine, such as a laundry machine.

The solid compositions can be a pressed or extruded solid. The resulting solid may take forms including, but not limited to: pellet, block, or tablet. In a preferred embodiment the solids are made from loose, flowable powders, the compositions are solid blocks with dimensional stability, as measured by a growth exponent of less than 5%, or less than 3% if heated to a temperate of 120° F. taking into account change in any dimension of the solid composition. In an exemplary embodiment, the solids can have a weight of at least about 50 grams, at least about 100 grams, at least about 250 grams, at least about 1 kilogram, or at least about 10 kilograms.

In some embodiments, the solid composition may be dissolved, for example, in an aqueous or other medium, to create a concentrated and/or use solution. The solution may be directed to a storage reservoir for later use and/or dilution, or may be applied directly to a point of use in the laundering application. The solid compositions are beneficially designed as multi-use solids, such as blocks, and can be repeatedly used as a solid laundry softening composition for multiple cycles.

Methods of Use

The solid laundry softening compositions are suitable for consumer and industrial laundering applications. Accordingly, single use and multi-use solid compositions can be provided according to the embodiments described here.

Generally for the laundry (i.e. fabric/textile) softening process, the solid softening composition is dispensed by contacting a solid with a sufficient amount of water to dissolve at least a portion of the solid laundry softening composition, thereby forming a dissolved portion of the solid laundry softening composition that can then be added to the rinse cycle of the laundry process. The water temperature for dispensing should be from about 40° C. to about 60° C., preferably from about 45° C. to about 55° C. The formulations of the present invention preferably dispense at greater than 10 grams/minute, more preferably greater than 15 grams/minute, and most preferably greater than 20 grams/minute.

The diluted liquid compositions formed from the solid compositions disclosed herein are preferably used in the rinse cycle of the conventional automatic laundry operations. Generally, rinse water has a temperature from about 5° C. to about 60° C.

Fabrics or fibers are contacted with an amount of the solid softening composition that is effective to achieve the desired level of softness. The amount used is based upon the judgment of the user, depending on concentration of the softening material, fiber or fabric type, degree of softness desired, and the like. The amount of softener dispensed is typically characterized as the ratio of the amount of softening quaternary ammonium compound active to the amount of linen. This ratio is preferably in the range of from 0.01% quaternary ammonium compound active to linen to as high as 0.25%, more preferably in the range of 0.025% to 0.20%.

The amount of water used to deliver this amount of solid softening composition can be any amount that can conveniently dissolve the desired dose in the required amount of time to deliver the softening composition to the rinse cycle of the machine. For example, using water from 45° C. to 55° C. a 100 g dose of softening composition is typically dispensed in from 1 to 4 minutes using from 2 to 10 liters of water.

The solid laundry softening compositions beneficially provide softness without causing any significant loss of water absorption or wicking to the treated linen. As one of the primary functions of certain linens, such as towels is to absorb water, it is undesirable for fabric softener actives to make the surface hydrophobic and decrease the amount of water that can be absorbed. The solid laundry softening compositions do not reduce water absorption—which can be measured by the distance water can wick up a treated linen in a fixed period of time (as outlined in the Examples).

Beneficially, the treated linens have premium softness in addition to whiteness, brightness and malodor removal. By softness, it is meant that the quality perceived by users through their tactile sense to be soft. Such tactile perceivable softness may be characterized by, but not limited to resilience, flexibility, fluffiness, slipperiness, and smoothness and subjective descriptions such as "feeling like silk or flannel." In an embodiment, the softness resulting from the use of the solid laundry softening composition is at least equivalent to the softness preference exhibited by commercially available liquid fabric softener compositions.

The solid laundry softening compositions beneficially provide softness without causing any significant yellowing or discoloration to the treated linen. The yellowing gives the linens an unclean or unsavory appearance at best. As such, the use of quaternary ammonium fabric conditioners which cause yellowing may provide a nice feel, but shorten the overall life of a linen because the linen must be discarded before its otherwise useful life is exhausted. In the case of colored linens, yellowing is less obvious but the quaternary ammonium compounds cause a dulling of the colors over time. It is easily appreciated that it is desirable according to the compositions and methods disclosed herein to provide a fabric softening agent that does not cause significant yellowing or dulling of fabrics that are repeatedly washed and dried. Moreover, it is generally desirable for white laundry that is dried to remain white even after multiple drying cycles. That is, it is desirable that the fabric not yellow or dull after repeated cycles of drying. Yellowing or discoloration can be measured either directly visually or using a spectrophotometer, typically through "L," "a," and "b" values of the color scale. The color change is then reported as delta E (as outlined in the Examples) between treated and new linen.

Typically, a value of delta E>1 is considered perceptible to the human eye and indicates discoloration, such as yellowing.

EXAMPLES

Embodiments of the present invention are further defined in the following non-limiting Examples. It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials used:

An amine carboxylate surfactant, available from Stepan Company.

An amine oxide, specifically a cocoamine oxide surfactant, available from Lonza.

A dialkyl ammonium methosulfate TEA esterquat, available from Stepan.

A methyldiethanolamine (MDEA) ester quaternary ammonium compound, available from Stepan.

A trisodium salt of methylglycinediacetic acid ($Na_3MGDA$), available from BASF Corporation.

An alkyl polyglucoside surfactant, available from Dow Chemicals.

LAE is a nonionic softening surfactant, seven-mole ethoxylate of linear, primary C12-C14 alcohol.

A silicone fluid emulsion, available from Wacker Chemie AG.

Commercially available betaine (40%), dicarboxylic acid mixture, fragrance, magnesium sulfate, polyethylene glycol 4000, sodium acetate, sodium chloride, sodium lauryl sulfate (SLS), sodium 1-octanesulfonate, stearic acid.

Example 1: Quaternary Ammonium Compound Loading/Absorption onto a Solid Carrier

A quaternary ammonium compound was evaluated to identify whether and to what extent the quaternary ammonium compound could be loaded onto a solid carrier. The quaternary ammonium compound evaluated was a TEA ester quat. The quaternary ammonium compound was incorporated into the formulation according to Table 2.

TABLE 2

| Ingredient | Formulation A (wt-%) |
|---|---|
| Magnesium sulfate | 66 |
| TEA ester quaternary ammonium compound | 25 |
| Silicone fluid emulsion | 2.5 |
| Water | 6.5 |
| Total | 100 |

The example shows that the addition of a quaternary ammonium compound to an inorganic salt, magnesium sulfate, until saturation (i.e. powder flow) is limited, demonstrating a need for stabilization, generally.

Example 2: Quaternary Ammonium Compound Loading/Absorption onto a Solid Carrier

A quaternary ammonium softener compound was evaluated in combination with an inorganic salt carrier (magnesium sulfate) to determine the stability of the composition to be formulated into a pressed solid softening composition. The pressed softening composition was formulated according to Table 3.

TABLE 3

| Ingredient | Formulation B (wt-%) |
|---|---|
| Magnesium sulfate | 67.5 |
| TEA ester quaternary ammonium compound | 27.4 |
| Water | 5.1 |
| Total | 100 |

Formulation B was then pressed into 50 g tablets as well as 2 pound blocks for stability evaluation of the pressed solids. The pressed tablets were stored for 4 weeks under temperature conditions of both 40° C. and 50° C. The visual stability for the 50 g tablets were evaluated after 4 weeks, and the stability results are shown in Table 4.

TABLE 4

| Conditions | Visual Stability (50 g Tablet) |
|---|---|
| After 4 weeks, 50° C. | Good - hard solid |
| After 4 weeks, 40° C. | Good - hard solid |

Further, the 21b blocks were stored for under different humidity environments. The 2 pound blocks were evaluated after either 4 weeks under temperatures of 50° C. or after 1 week under temperatures of 40° C. and 65% relative humidity. The visual stability results are shown in Table 5.

TABLE 5

| Conditions | Visual Stability (2 lb Block) |
|---|---|
| After 4 weeks, 50° C. | Good - hard solid |
| After 1 week, 40° C., 65% relative humidity | Fail - hard solid, swelling/blooming at top of the block |

As shown in the results in Tables 4 and 5, there is a noticeable instability of the solid compositions under high humidity conditions. Without being bound by a particular theory, the instability is due to the hygroscopic properties of magnesium sulfate, causing it to absorb water from the humidity chamber, resulting in the solid composition swelling or blooming. This result is further demonstrated in FIG. 1. The solid block in FIG. 1 is the result of after only 3 days under temperatures of 40° C. inside a humidity chamber with 65% humidity. The top of the block shows swelling (i.e. blooming) such that the solid has not maintained its shape and would not be considered dimensionally stable. These results demonstrate that although an inorganic carrier can increase the absorption of quaternary ammonium softener compounds, there remains an issue surrounding the instability of such solid compounds in humid environments.

Example 3: Quaternary Ammonium Compound Loading onto a Solid Carrier with a Surfactant As shown in the previous examples, solid formulations heavily loaded with quaternary ammonium compounds can lose stability, especially in the presence of high humidity due to the inclusion of hygroscopic materials for the solid composition. Therefore, solid softening compositions containing quaternary ammonium compounds were evaluated with various types of surfactants to test the ability of the various surfactants to stabilize the solid quaternary softening compositions.

Figures 2A, 2B, 2C:
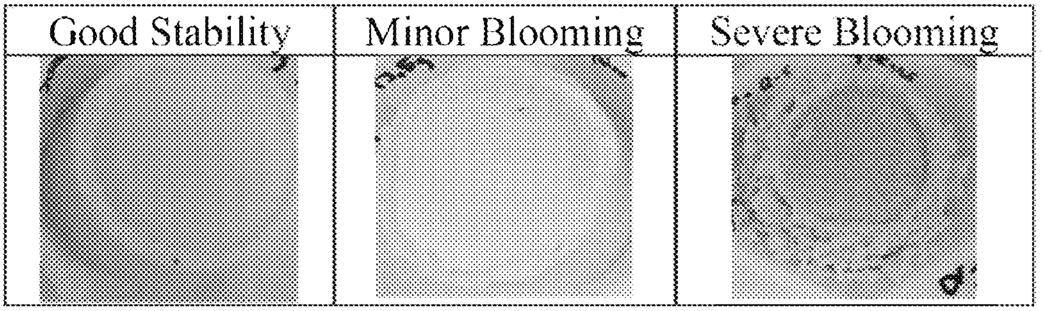
FIGS. 2A-2C show comparison images of solid compositions having varying degrees of blooming, including solids having good stability (FIG. 2A), minor blooming (FIG. 2B), and severe blooming (FIG. 2C).

Various experiments were conducted on solid quaternary softener compositions having 20 wt-% of a quaternary ammonium softening compound, varying wt-% of stabilizing surfactant, wherein the remainder of the solid formulations is formulated with magnesium sulfate for a total of 100 wt-%. The various experiments are shown in Table 6. The solid compositions were stored for 4 weeks at a temperature of 40° C. inside a humidity chamber with 65% relative humidity. The degree of blooming of the solid compositions were evaluated. A visual depiction of examples of various degrees of blooming are shown in FIG. 2 for reference. As shown in FIG. 2, the more severe the blooming, the less stable the solid composition. The results of the stability of the solid quaternary softener compositions with respect to blooming are further shown in Table 6.

TABLE 6

| Exp | Surfactant | Surfactant wt-% in the Solid Quaternary Softener Compositions | Surfactant Type | Blooming Observations |
|---|---|---|---|---|
| 1 | Betaine, 40% | 15.4 | Amphiphilic (Quat-Carboxylate) | Minor blooming on top |
| 2 | sodium 1-octanesulfonate, 30% | 15.4 | Anionic (Sulfonate) | Minor blooming on top |
| 3 | cocoamine oxide, 30% | 14.4 | Amphiphilic (Amine oxide) | Good stability |
| 4 | SLS, 30% | 15.4 | Anionic (Sulfate) | Good stability |
| 5 | Trisodium salt MGDA, 40% | 12.5 | Chelant | Minor blooming on top |
| 6 | Commercially available quaternary ammonium surfactant-containing softening composition, 25% | 15.4 | Quaternary Ammonium | Severe blooming |
| 7 | Alkyl polyglucoside, 50% | 15.4 | Alkyl Poly Glucoside | Severe blooming |
| 8 | Amine carboxylate | 15.4 | Amphiphilic (Amine-carboxylate)= | Severe blooming |

As shown in the results of Table 6, various amine oxide amphiphilic and anionic surfactants surprisingly stabilized the solid softener compositions containing quaternary ammonium compounds, even under high humidity conditions. The surfactants that fall outside these categories resulted in severe blooming of the solid compositions.

Example 4

Exemplary solid quaternary ammonium softener compositions were formulated with both an inorganic carrier and amine oxide surfactant to evaluate the dimensional stability of the compositions to form pressed solids. The exemplary formulations are provided in Table 7.

TABLE 7

| Ingredient | Formulation 1 (wt-%) | Formulation 2 (wt-%) |
|---|---|---|
| Magnesium sulfate | 64.10 | 65.18 |
| TEA ester quaternary ammonium compound | 25.00 | 25.00 |
| Silicone emulsion | 2.11 | 2.03 |
| Amine oxide surfactant | 8.00 | 7.00 |
| Additional ingredients | 1.39 | 1.39 |
| Total | 100 | 100 |

Figure 3:
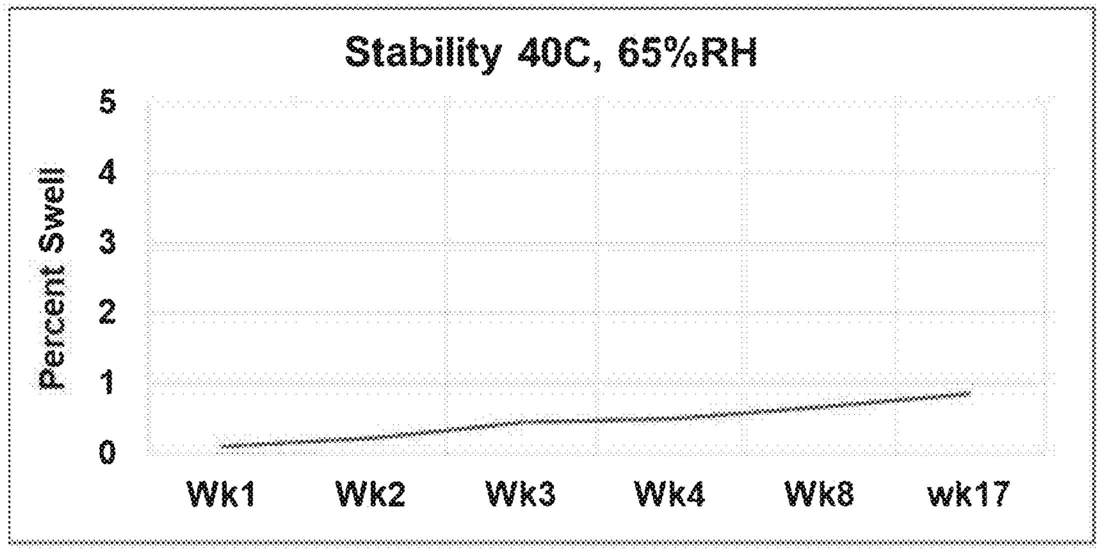
FIG. 3 depicts a graphical representation of the dimensional stability of a pressed solid composition under temperatures of 40° C. and 65% relative humidity, wherein a stabilizing surfactant was added to a quaternary ammonium softener composition.
Figure 4:
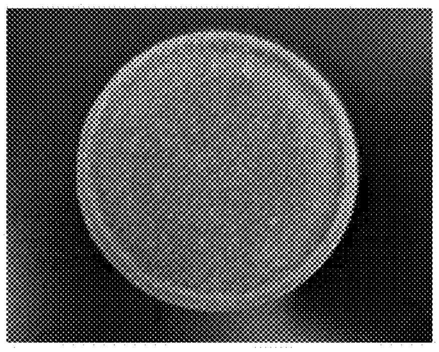
FIG. 4 shows an image of a pressed solid quaternary ammonium softener composition containing a stability surfactant after 17 weeks at 40° C. and 65% relative humidity.

The dimensional stability of the formulations was measured weekly by measuring the percent swelling of the pressed solid for up to 17 weeks, under temperature conditions of 40° C. and 65% relative humidity. The graphical representation of the dimensional stability for Formulation 2 is shown in FIG. 3. As the results show in FIG. 3, Formulation 2 maintained <1% swelling over a period of 17 weeks, even in a highly humid environment. The stability of the pressed solid of Formulation 2 can be further seen in FIG. 4, where the image shows pressed Formulation 2 after 17 weeks under temperatures of 40° C. and 65% relative humidity. As shown in FIG. 4, the pressed solid maintained its shape after 17 weeks under high humidity, demonstrating the efficacy of including a stabilizing surfactant in the solid quaternary softener composition.

Example 6: Quaternary Ammonium Compound Softening Assessment

Cotton towel samples were treated with softener formulations and softness was evaluated with a phabrometer. The cotton towel samples were prepared by running cotton towels through five double scouring cycles with a load weight of approximately 28 lbs. and drying between each cycle. Using a die press with an 11.3 cm circular die, sample swatches were cut from the scoured hand towels, such that there were at least four sample swatches per formulation evaluated. The swatches were labeled according to their test condition.

1500 mL beakers were placed on a hotplate with a stir bar and 500 mL of DI water. Temperature was set to 40° C. and the stir bars were set to spin at 400 RPM. The desired type and quantity of softening formulation was delivered to each beaker. A methyldiethanolamine (MDEA) ester quaternary ammonium compound was dosed at 40 ppm per 25 g towels, with a 6:1 ratio of quat:surfactant, while a triethanolamine (TEA) ester quaternary ammonium compound was dosed at 60 ppm per 25 g towels, with a 10:1 ratio of quat:surfactant. The beakers were then allowed to mix thoroughly and reach the desired temperature. After mixing, swatches were added one at a time to their respective beakers and were allowed to mix for six minutes. After six minutes, the solution was emptied from each beaker and the swatches were extracted and allow to dry for 20 minutes. All swatches were then placed in a humidity chamber and allowed to sit overnight at 40% humidity.

Fabric analysis was conducted in the phabrometer, where the swatches were individually weighed down and forced through an orifice while measuring/calculating the attributes of softness and resilience. The treated fabrics were compared to a blank, or a control composition that is a commercially available quaternary ammonium compound-silicone softening booster. In general, a larger softness value is attributed to a softer fabric. A larger resilience value is attributed to a more resilient fabric.

Figure 5:
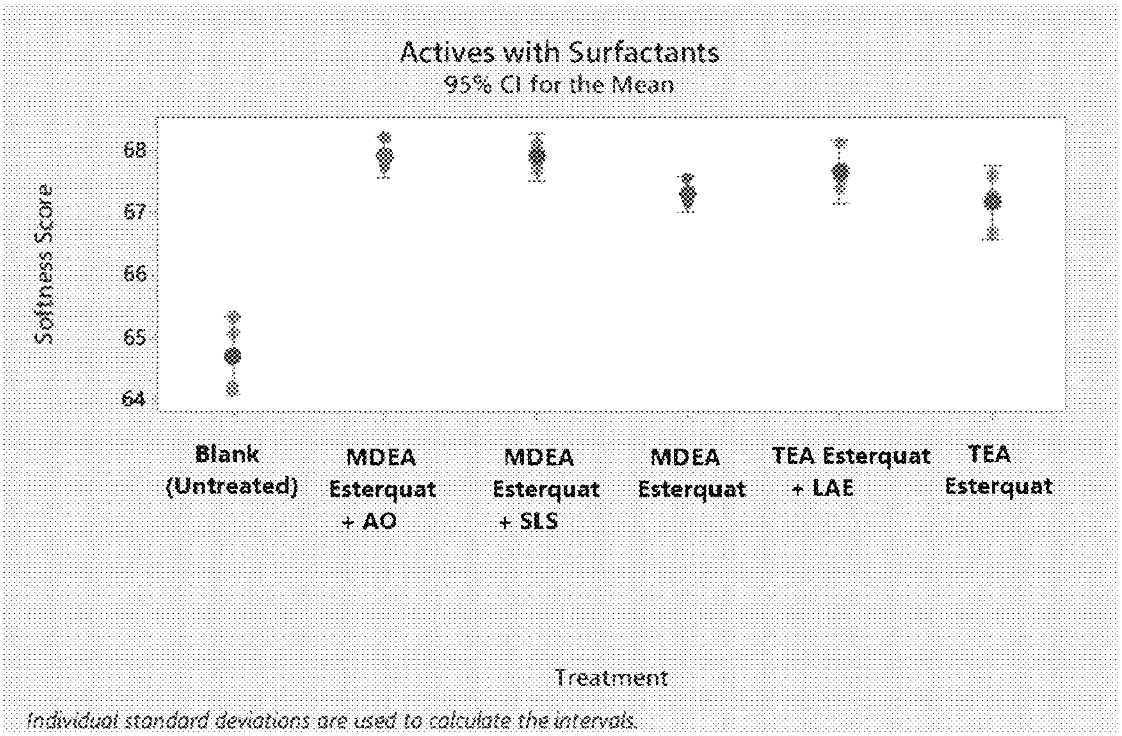
FIG. 5 depicts the results of fabric analysis with the phabrometer in terms of fabric softness.
Figure 6:
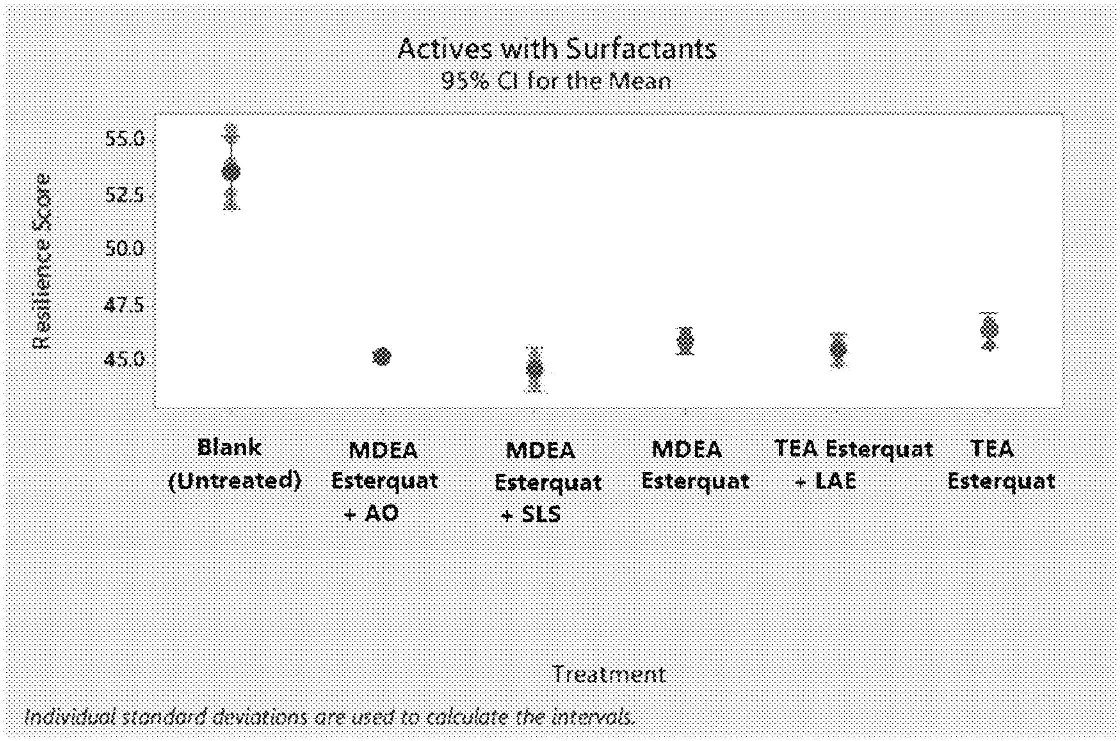
FIG. 6 depicts the results of fabric analysis with the phabrometer in terms of fabric resilience.

The results of the analysis in the phabrometer are shown in FIG. 5 and FIG. 6, where the blank is an untreated towel without any softness treatment, that demonstrate that the formulations of the application beneficially maintain good fabric softness without significantly impacting the integrity of the fabric. The comparison of the various surfactants for performance (i.e. softness) show efficacy of nonionics in addition to the anionics and amphiphilic surfactants which provide the efficacy and block stability. As shown the softness was not impacted by surfactant type.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for treating fabric in a wash wheel, the method comprising:

(a) providing a solid laundry softening composition comprising:

at least about 15 wt-% of a quaternary ammonium compound having the formula:

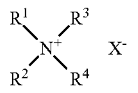

wherein R1 and R2 represent the same or different hydrocarbyl groups having from 8 to 24 carbon atoms, $R^3$ and $R^4$ represent the same or different hydrocarbyl groups containing 1 to about 4 carbon atoms, and X is an anion; and from about 50 wt-% to about 80 wt-% of an inorganic salt carrier comprising a magnesium cation, wherein the solid laundry softening composition is a stable solid composition formed from a flowable powder and does not contain organic salt carrier;

(b) contacting the solid laundry softening composition with water to form an aqueous suspension; and (c) dispensing the aqueous suspension to a wash wheel, where it contacts the fabric to be treated.

2. The method of claim 1, wherein the quaternary ammonium compounds $R^1$ and $R^2$ represent the same or different hydrocarbyl groups having from 12 to 18 carbon atoms, $R^3$ and $R^4$ represent the same or different hydrocarbyl groups containing 1 to about 4 carbon atoms.

3. The method of claim 1, wherein the quaternary ammonium compound comprises alkyl benzyl ammonium chloride, alkyl ethylbenzyl ammonium chloride, or dialkyl ammonium salt.

4. The method of claim 3, wherein the quaternary ammonium compound comprises alkyl C12-C18 benzyl ammonium chloride, alkyl C12-C18 ethylbenzyl ammonium chloride, or di alkyl C12-C18 di alkyl C1-C4 ammonium salt.

5. The method of claim 1, wherein the quaternary ammonium compounds comprise an ester quat, amidoamine, imidazoline, esteramide salt, or combinations thereof.

6. The method of claim 1, wherein the inorganic salt carrier and the quaternary ammonium compounds combine to provide a flowable powder to press into a solid composition.

7. The method of claim 6, wherein the inorganic salt carrier further comprises a cation for an inorganic salt comprising sodium, potassium, calcium, ammonium and/or amine, and further comprises an anion for an inorganic salt comprising chloride, sulfate, carboxylate, polycarboxylate, carbonate, bicarbonate, carboxylate, phosphate and/or hydroxide.

8. The method of claim 7, wherein the inorganic salt comprises magnesium sulfate, sodium sulfate, sodium chloride, citrate salts, ethylene diamine tetraacetic acid salt (EDTA), sodium carbonate, sodium bicarbonate, sodium carboxylate, sodium hydroxide, potassium chloride, potassium hydroxide, calcium chloride and/or ammonium carboxylate.

9. The method of claim 1, wherein the quaternary ammonium compound comprises from about 15 wt-% to about 80 wt-%, or from about 25 wt-% to about 60 wt-% of the solid laundry softening composition, and wherein the inorganic salt carrier comprises from about 50 wt-% to about 70 wt-% of the solid laundry softening composition.

10. The method of claim 1, further comprising a softening booster in the amount of between about 0.1 wt-% to about 20 wt-% of the solid composition.

11. The method of claim 10, wherein the softening booster is a deposition aid or a silicone compound or polymer.

12. The method of claim 11, wherein the silicone is a silicone emulsion and no additional water is added to make the solid composition, and/or wherein the silicone is an organosilicone comprising a polyalkyl silicone, an aminosilicone, a siloxane, a polydimethyl siloxane, an ethoxylated organosilicone, a propoxylated organosilicone, an ethoxylated/propoxylated organosilicone, or mixtures thereof.

13. The method of claim 1, wherein the solid laundry softening composition further comprises an effective amount of a surfactant comprising an anionic surfactant and/or amine oxide surfactant.

14. The method of claim 13, wherein the anionic surfactant comprises alkyl sulfonates, linear and branched primary and secondary alkyl sulfonates, aromatic sulfonates with or without substituents, or combinations thereof, or wherein the anionic surfactant comprises alkyl ether sulfates, alkyl sulfates, linear and branched primary and secondary alkyl sulfates, or combinations thereof.

15. The method of claim 13, wherein the amine oxide surfactant comprises a coconut or tallow alkyl di-(lower alkyl) amine oxide.

16. The method of claim 13, wherein the surfactant comprises from about 1 wt-% to about 30 wt-% of the solid composition.

17. The method of claim 1, wherein the solid laundry softening composition further comprises a processing aid, surfactant, acid, and/or other additional functional ingredient.

18. The method of claim 1, wherein the solid laundry softening composition is a multi-use composition that is at least 250 grams, and/or wherein the solid is a cast or extruded solid, and wherein the solid is a capsule, tablet, puck, brick or block.

* * * * *